Patented Mar. 11, 1930

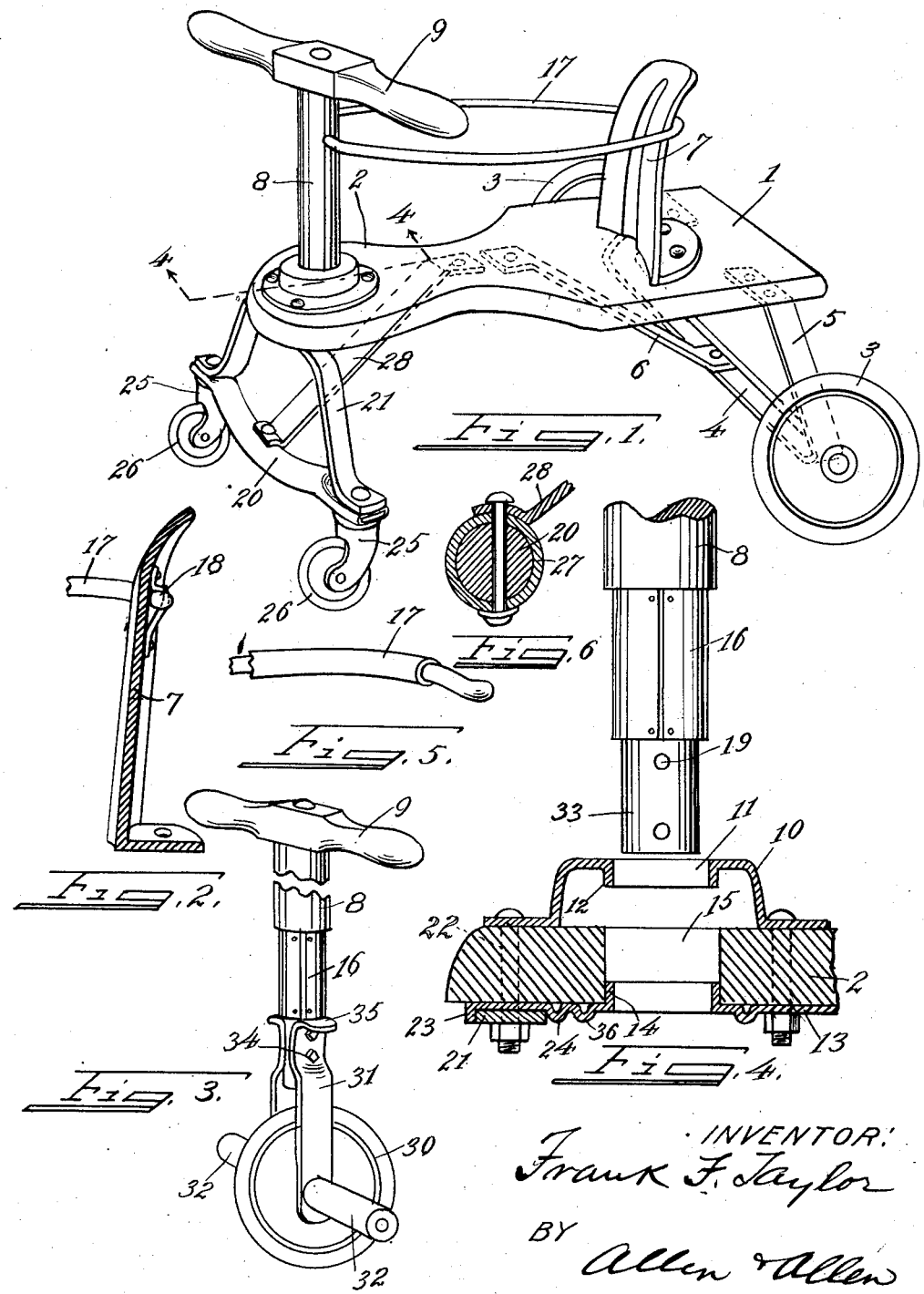

1,750,547

UNITED STATES PATENT OFFICE

FRANK F. TAYLOR, OF NORWOOD, OHIO

TOY VEHICLE

Application filed January 31, 1924. Serial No. 689,787.

My invention relates to toy vehicles for children, which are designed for use as a baby walker, but which can be readily converted, as soon as the child has outgrown the baby age, into the vehicle familiarly known as a child's car, with a single wheel in front.

For use for a baby, it is necessary that the baby should be supported from falling off, and that with its feet on the ground, it shall be possible to move the vehicle in any direction without tipping it over.

The special object of my invention, therefore, is to provide a construction in which for use as a baby walker, the vehicle may be provided with four wheels, with the front wheels widely separated, and having casters so as to turn easily in any direction, with an upwardly projecting handle post fixed in position, and to so arrange the construction that the handle post may be released from its fixed position and become the steering column for the single supporting wheel to be substituted for the two front wheels of the baby walker construction.

Another object is to so design the construction that the axle bar for supporting the two front wheels for the baby walker may be rubber protected and utilized as a bumper to prevent the baby from marring the furniture when using the device.

These various objects are accomplished by that certain construction and arrangement of parts to be hereinafter more particularly pointed out and claimed.

In the drawing:

Figure 1 is a perspective view of the device when used as a baby walker.

Figure 2 is a detail section of the back support.

Figure 3 is a perspective view showing the steering wheel construction for the child's car.

Figure 4 is a detail longitudinal section of the frame taken on the line 4—4 of Figure 1.

Figure 5 is a detail perspective of one end of the circular guard ring.

Figure 6 is a central cross section of the front axle of the baby walker.

The vehicle is provided with a flat board 1 of saddle-like shape having a narrow circular front end 2. The rear wheels 3, 3, are mounted on the end of an axle bar 4, which has upwardly extending arms 5, screwed to the bottom of the base board at the back, and this axle bar is further supported and braced by an upwardly extending brace bar 6, which is also screwed to the bottom of the base board.

Mounted permanently on the rear portion of the base board, is a back support 7 for the child, this back support being preferably curved to fit the back of the user.

At the front of the board, is mounted a steering post 8, provided with a handle 9. Secured on top of the circular front portion 2, is a plate 10, with a central hole 11, with the plate having a downwardly turned flange 12. Underneath the plate 10 on the under surface of the board is a circular plate 13, provided with an opening to correspond with the opening 11, and having an up-turned flange 14, which fits within a central hole 15 in the board.

The lower end of the steering post 8 is slightly diminished in diameter, and is shod with a metal lining 16, and this portion of the post has a bearing on the flanges 12 and 14.

A circular ring 17 is removably secured in a loop 18 at the upper portion of the rear of the back support 7, and this circular ring extends through a hole in the steering post 8. This ring is preferably covered with rubber tubing, and forms a support for the baby when placed on the vehicle with his feet straddling the narrower portion of the board.

The ring also serves to hold the steering post rigid so that it can turn when the vehicle is used as a baby walker, and in order to prevent the steering post 8 lifting up, a bolt is passed through the hole 19 in the lower end of the steering post.

For the front support of the baby walker, I provide as follows:

A curved preferably round axle bar 20 is flattened at the ends to be united to the ends of the upwardly extending supporting bar 21, which is bolted to the under surface of the front of the frame board by the same two bolts 22, 22, by which the plates 10 and 13 are secured, and in order to hold the bar 21 rigid, the plate 13 is formed with a flange 23 and a rib 24 to provide a recess for the bar 21. The outer ends of the bar 21 and the flattened ends of the axle 20 are riveted together preferably by the same rivet, which secures the upper fixed member of the swiveled caster forks 25, carrying the rubber tired caster wheels 26, 26. The axle 20 is curved forwardly in a horizontal plane, so that it will extend slightly beyond the front end of the frame board, and this axle is preferably enclosed in a rubber tube 27. The axle bar is braced by a central brace 28, riveted or bolted to the axle bar on the outside of the rubber tubing, which encloses the bar. The several wheels of the baby walker are provided with ball bearings, if desired, and as both front and rear wheels are spaced apart beyond the width of the frame board, a very stout, substantial construction is the result.

Now when it is desired to use the device as a child's car, the front wheels and the supporting frame can readily be removed. The guard ring 17 is also removed by springing the ends out of the loop 18, and passing the rod through the hole in the steering post. This frees the steering post, and permits it to turn.

There is provided for use as a child's car, a single front wheel 30 mounted in a bifurcated frame 31 with laterally projecting foot rests 32, 32. The upper end of this frame 31 is curved so as to embrace the lower end 33 of the steering post, and the single wheel is then bolted by bolts 34 to the lower end of the steering post. The frame 31 is formed with projecting horizontal portions 35, which bear under the plate 13, and readily turn within the circular rib 36 on the plate.

It will, therefore, be obvious that the baby walker can be readily and easily converted into a child's car, and that the fixed post for the baby walker which supports the guard ring in front, becomes a steering post for the child's car.

Having thus described my invention, what I claim as new and desire to secure by Letters Patent, is:—

1. In a toy vehicle of the character specified, a board forming the seat with wheels for supporting the same at the rear, an upright rotatably mounted post at the front provided with connecting means for supporting and guiding a single wheel, a caster mounting element with two widely interspaced caster wheels to give a wide wheel base having means for securing it to the vehicle interchangeably with said single wheel, and a guard ring to hold and protect the user, provided with means for engaging and locking the post when the caster element is used.

2. In a toy vehicle of the character specified, a board forming the seat with wheels for supporting the same at the rear, an upright rotatably mounted post at the front provided with connecting means for supporting and guiding a single wheel, a caster mounting element with two widely interspaced caster wheels to give a wide wheel base having means for securing it to the vehicle interchangeably with said single wheel, and a permanent back rest for the seat and a guard ring removably secured to the back rest, and passing through the post to hold same against rotation.

3. In combination with a child's vehicle having rear carrying wheels and a caster carrying frame at the front thereof, with a post having handles thereon extending up at the front of the vehicle, said post being provided with means for fixing same in non-rotatable position, and for releasing the fixed position thereof, a single wheel and support therefore interchangeable with said caster frame and provided with mounting devices for connecting same with said front post when said post is released for rotation, said interchangeable single wheel support being attachable behind the plane of the axes of the casters carried by said frame, said single wheel support having an axle with extensions at the sidse of the axle for receiving a child's feet.

4. In combination with a child's vehicle having rear carrying wheels and a caster carrying frame at the front thereof, with a post having handles thereon extending up at the front of the vehicle, said post being provided with means for fixing same in non-rotatable position and for releasing the fixed position thereon, a single wheel and support therefore interchangeable with said caster frame and provided with mounting devices for connecting same with said front post when said post is released for rotation, said interchangeable single wheel support being attachable behind the plane of the axes of the casters carried by said frame, and said frame having a front bar curving forwardly lengthwise of the bar and with a rubber element secured thereto to act as a bumper.

FRANK F. TAYLOR.